Patented Oct. 24, 1950

2,526,644

UNITED STATES PATENT OFFICE 2,526,644

ALDEHYDE-AMMONIUM THIOCYANATE-FURFURYL ALCOHOL RESINS

Andrew P. Dunlop, Riverside, and Paul R. Stout, Chicago, Ill., assignors to The Quaker Oats Company, a corporation of New Jersey No Drawing. Application September 3, 1947, Serial No. 772,022

8 Claims. (Cl. 260—67)

This invention relates to novel synthetic resins of the thermosetting type which are formed by the condensation of an aldehyde with the resinous, partial reaction product of ammonium thiocyanate and furfuryl alcohol or furfuryl alcohol partial polymer (partially resinified furfuryl alcohol).

These new resins when used alone or together with other resinous materials are useful in the preparation of solutions for protective coatings and varnishes and for impregnating and laminating purposes, and in the preparation of molded products. In connection with the latter use, the resin may be used in conjunction with suitable fillers. Surface coatings containing the resins are particularly useful as a sealer or finishing coat for table tops of wood and similar materials and for wire.

In general, the invention comprises the reaction under the influence of heat of ammonium thiocyanate and furfuryl alcohol or partially polymerized furfuryl alcohol to form a resinous partial reaction product which is then reacted with an aldehyde to form a liquid thermosetting resin. The application of heat to the reaction mixture quickly brings about the formation of a water-insoluble, liquid thermosetting resin which, on further heating, converts to a solid and infusible resin resistant to both acidic and basic chemical reagents.

The partially polymerized furfuryl alcohol which may be used in accordance with the present invention is a pourable, partially resinified furfuryl alcohol of any desired viscosity. It may be prepared by any of the known methods, but we prefer to prepare it in accordance with the procedures described in our copending application Serial No. 758,508, filed July 2, 1947.

In carrying out the present invention, a solution of ammonium thiocyanate in furfuryl alcohol or a liquid partially polymerized furfuryl alcohol is heated with or without a catalyst until a liquid resinous material is obtained, and this resinous material is then reacted with an aldehyde to form the liquid thermosetting resin of the present invention.

The reaction of the ammonium thiocyanate with the furfuryl alcohol to form a liquid resin is described in the Root and Virgin Patent No. 2,368,426, granted January 30, 1945. In general, the liquid resins produced in accordance with the procedures described in this patent are slowly thermosetting. The resins produced in accordance with the present invention, on the other hand, are, in general, more quickly thermosetting.

In making the resins of the present invention the base resin used may suitably be one of the ammonium thiocyanate-furfuryl alcohol resins described in the Root and Virgin patent, which may be made from varying percentages of the reactants, ranging from approximately molar proportions to a substantial excess of furfuryl alcohol with respect to the ammonium thiocyanate. Or it may be a base resin formed by reacting ammonium thiocyanate with a liquid furfuryl alcohol heat polymer or a liquid, acid-catalyzed partial polymer of furfuryl alcohol, prepared in accordance with known procedures.

In general, the amount of the aldehyde which will react with the base resin is directly related to the amount of ammonium thiocyanate in the base resin. The vigor of the reaction is also directly related to the content of ammonium thiocyanate in the base resin, and also upon the particular aldehyde used. Formaldehyde promotes the most vigorous reaction and thereby reduces the reaction time. For this reason formaldehyde is preferred.

For most purposes, satisfactory resins in accordance with the present invention are produced with an amount of aldehyde corresponding to the amount of furfuryl alcohol or partially resinified furfuryl alcohol used in making the base resin. The amount of aldehyde which may be used may be in the proportions of 0.2 to 2.0 or even more moles of the aldehyde per mole of furfuryl alcohol or partially resinified furfuryl alcohol. Equimolar proportions are preferred, however.

The character of the final infusible resinous product as to flexibility, adhesiveness and hardness can be controlled by varying the quantity of the reactants used.

The reaction between the base resin and the aldehyde may be effected in an open vessel; however, we prefer to carry it out under reflux conditions. The reaction temperature may vary widely, say from about 60° to 140° C. In most instances the reaction may be carried out at temperatures below about 110° C., say between about 65°-90° C. The time of the reaction may vary widely from about 5 minutes to 2 hours, depending upon the temperature of the reaction and the proportion of the reactants used. In most instances the desired water-insoluble, liquid thermosetting resins are formed in about 5 minutes to about ½ hour. When the desired resin is formed the reaction mixture should be quickly cooled so that the resin will not become converted to the infusible state.

While formaldehyde is the preferred aldehyde in accordance with the present invention, any aldehyde which has the property of condensing with the ammonium thiocyanate-furfuryl alcohol base resin to form resinous materials may be used in accordance with our invention. The formaldehyde may be used as such or in a polymerized form. Examples of suitable aldehydes are formaldehyde, paraformaldehyde, trioxymethylene, acetaldehyde, butyraldehyde, acrolein, furylacrolein, crotonaldehyde, glyoxal, benzaldehyde and furfural.

The following examples illustrate the preparation of resinous products in accordance with the present invention, except for Example 1 which is a base resin made in accordance with the procedures of the aforesaid Root and Virgin patent. It is to be understood that the invention is not limited to the specific conditions or details set forth in these illustrative examples. In all the examples parts given are parts by weight.

Example 1

100 parts of ammonium thiocyanate and 300 parts of furfuryl alcohol were stirred in an open flask at 120° C. After about 20 minutes the exothermic reaction raised the temperature to about 137° C. for 10 minutes. After the temperature had subsided the heating was continued at 120° C. to give a total reaction time of 1½ hours. The resulting product was a thick liquid resin which had a stroke cure of 11 minutes and a solids yield of 79%.

The solids yield is determined by heating five to ten grams of the resin in an oven at 180°–200° C. for about 16 hours. The weight of the cured product so obtained, divided by the weight of reactants in the sample heated (excluding solvents such as water, gives the solids yield.

The stroke cure has been defined as the time required for a resin to convert from a fusible or liquid condition at a definite temperature while being stroked with a spatula to a condition at which the spatula either no longer sticks to the resin or slides over it with relative ease. In practice about 2 cc. of the resin is placed on a hot plate, the temperature of which is adjusted to 145°–150° C., and stroked (approximately 90–100 strokes per minute) with the flat side of a spatula to smooth the resin into a square 2 to 3 inches on a side. The time in seconds for the volatiles to evaporate, for the resin to start to become stringy or gummy and the cure time are recorded.

Example 2

40 parts of the resin of Example 1 and 29.4 parts of furfural were heated under reflux at 68–70° C. for 25 minutes and then quickly cooled. A thick liquid resin was obtained which had a stroke cure of 15 seconds and a solids yield of 79%.

Example 3

40 parts of the resin of Example 1, 20 parts of water and 21.4 parts of crotonaldehyde were heated under reflux at 70–90° C. for 20 minutes and then quickly cooled. The mixture was dehydrated under vacuum at 25–40° C. A very viscous liquid resin was obtained which had a stroke cure of 2¾ minutes and a solids yield of 77%.

Example 4

40 parts of the resin of Example 1 and 8.1 parts of 37% formalin solution were heated under reflux at 50° C. at which temperature an exothermic reaction set in raising the temperature to 67° C. at which point it was held for four minutes and then quickly cooled. A very viscous brown resin was obtained which had a solids yield of 80%. The stroke cure of this resin was more rapid than that of the resin of Example 2.

Example 5

40 parts of the resin of Example 1, 21.4 parts of crotonaldehyde, and 40 parts of ethyl acetate were heated under reflux at 70–82° C. for 25 minutes, to give a thin resin solution with a stroke cure of 4½ minutes and a solids yield of 74%.

Example 6

40 parts of the resin of Example 1 and 57.5 parts of 31% glyoxal solution were heated under reflux at 80–90° C. for 15 minutes and then cooled and dehydrated under vacuum. The product consisted of a semi-solid resin with a stroke cure of 80 seconds, and a liquid phase which was mostly volatiles.

Similar liquid thermosetting resins in accordance with the present invention were prepared from base resins wherein the ammonium thiocyanate constituted 4.7% and 34% by weight of the reaction mixture instead of the 25% of Example 1, and wherein the aldehydes reacted with these base resins were formaldehyde, furfural, crotonaldehyde and glyoxal.

A furfuryl alcohol partial polymer which may be used in accordance with this invention may be prepared by refluxing technical furfuryl alcohol for 68 hours. The resulting partially resinified furfuryl alcohol had a viscosity of about 2 centipoises at 25° C. It may also be prepared as follows.

A mixture of 45 lbs. of technical furfuryl alcohol and 4½ lbs. of water was heated to boiling, and a solution of 22½ ml. of 85% $H_3PO_4$ in 200 ml. of water was added slowly. After refluxing for three hours, the mixture was neutralized by adding a solution of 26 grams of NaOH in 300 ml. of water. The mixture was cooled, allowed to stand overnight, and the water layer separated and discarded. The resulting resin had a viscosity of about 20 centipoises at 25° C.

30 parts of this furfuryl alcohol acid-catalyzed resin and 10 parts of ammonium thiocyanate were heated at 120° C. for 30 minutes in an open beaker to form a resin. This resin may be reacted with aldehydes to form thermosetting resins in accordance with the present invention.

Example 7

60 parts of the furfuryl alcohol heat resin of 2 centipoises viscosity referred to above were heated with 20 parts of ammonium thiocyanate under reflux in a steam bath at about 90° C. for about eight hours. The reflux condenser was then replaced by a stream of air, and heating was continued on a wax bath at 120° C. for 20 minutes. During this time the resin temperature was 80–97° C. The resulting resin had a stroke cure of 1½ minutes and a solids yield of 75%.

40.5 parts of the foregoing resin and 8.3 parts of 37% formalin solution were heated under reflux in a water bath at 70° C. for fifteen minutes, yielding a resin having a solids yield of 76% and a stroke cure of about 8 seconds.

In general, the resins prepared in accordance with the present invention cure rapidly at temperatures of about 150° to 175° C. without added curing catalysts. Curing catalysts such as hexamethylenetetramine do not appear to increase the rate of curing to any appreciable extent.

We claim:

1. A process of producing a new artificial resin which consists in condensing a furfuryl alcohol-ammonium thiocyanate partial resinification product with an aldehyde at least until a liquid thermosetting resin is produced.

2. A process of producing a new articificial resin which consists in heating a mixture of furfuryl alcohol and ammonium thiocyanate until a resinous, partial condensation product is formed and reacting said product with an aldehyde at least until a liquid thermosetting resin is produced.

3. A process of producing a new artificial resin which consists in heating a mixture of furfuryl alcohol and ammonium thiocyanate until a resinous, partial condensation product is formed and reacting said product with formaldehyde at least until a liquid thermosetting resin is produced.

4. A process of producing a new artificial resin which consists in heating a mixture of furfuryl alcohol and ammonium thiocyanate until a resinous, partial condensation product is formed and reacting said product with furfural at least until a liquid thermosetting resin is produced.

5. A process of producing a new artificial resin which consists in heating a mixture of furfuryl alcohol and ammonium thiocyanate until a resinous, partial condensation product is formed and reacting said product with glyoxal at least until a liquid thermosetting resin is produced.

6. A process of producing a new artificial resin which consists in heating a mixture of furfuryl alcohol and ammonium thiocyanate until a resinous, partial condensation product is formed and reacting said product with crotonaldehyde at least until a liquid thermosetting resin is produced.

7. A process of producing a new artificial resin which consists in heating a mixture of a liquid, partially resinified furfuryl alcohol and ammonium thiocyanate until a resinous, partial condensation product is formed and reacting said product with an aldehyde at least until a liquid thermosetting resin is produced.

8. A process of producing a new artificial resin which consists in heating a mixture of a liquid, partially resinified furfuryl alcohol and ammonium thiocyanate until a resinous, partial condensation product is formed and reacting said product with formaldehyde at least until a liquid thermosetting resin is produced.

ANDREW P. DUNLOP.
PAUL R. STOUT.

REFERENCES CITED

The following references are of record in the file of this patent:

UNITED STATES PATENTS

| Number | Name | Date |
|---|---|---|
| 2,368,426 | Root et al. | Jan. 30, 1945 |